(12) United States Patent
McWilliams et al.

(10) Patent No.: US 9,053,586 B1
(45) Date of Patent: *Jun. 9, 2015

(54) SECURITY SYSTEM

(75) Inventors: James T. McWilliams, South Lebanon, OH (US); Judith A. McWilliams, South Lebanon, OH (US); Drew M. McWilliams, Waxhaw, NC (US); Jennifer L. McWilliams, Waxhaw, NC (US)

(73) Assignee: McWilliams Security, LLC, Charlotte, NC (US)

( * ) Notice: Subject to any disclaimer, the term of this patent is extended or adjusted under 35 U.S.C. 154(b) by 174 days.

This patent is subject to a terminal disclaimer.

(21) Appl. No.: 13/442,071

(22) Filed: Apr. 9, 2012

Related U.S. Application Data

(63) Continuation of application No. 11/905,437, filed on Oct. 1, 2007, now Pat. No. 8,155,392.

(51) Int. Cl.

| | |
|---|---|
| *G06K 9/00* | (2006.01) |
| *G07C 9/00* | (2006.01) |
| *G07C 11/00* | (2006.01) |
| *G01G 1/20* | (2006.01) |
| *G06Q 20/40* | (2012.01) |
| *G08B 25/00* | (2006.01) |

(52) U.S. Cl.
CPC ............ *G07C 9/00079* (2013.01); *G06Q 20/40* (2013.01); *G07C 11/00* (2013.01); *G08B 25/008* (2013.01); *G01G 1/20* (2013.01)

(58) Field of Classification Search
None
See application file for complete search history.

(56) References Cited

U.S. PATENT DOCUMENTS

| | | | |
|---|---|---|---|
| 4,350,969 | A | 9/1982 | Greer |
| 5,021,780 | A | 6/1991 | Fabiano et al. |
| 5,423,574 | A | 6/1995 | Forte-Pathroff |
| 5,657,389 | A | 8/1997 | Houvener |
| 5,978,493 | A * | 11/1999 | Kravitz et al. ............... 382/115 |
| 6,394,356 | B1 | 5/2002 | Zagami |
| 6,801,907 | B1 | 10/2004 | Zagami |
| 6,958,676 | B1 | 10/2005 | Morgan et al. |
| 6,958,701 | B1 | 10/2005 | Storkamp et al. |
| 7,233,240 | B2 | 6/2007 | Phillips |
| 8,155,392 | B1 * | 4/2012 | Mcwilliams et al. ......... 382/115 |
| 8,376,803 | B2 * | 2/2013 | Oonaka ........................ 446/175 |
| 2005/0110610 | A1 * | 5/2005 | Bazakos et al. .............. 340/5.82 |
| 2005/0200478 | A1 * | 9/2005 | Koch et al. ............... 340/539.13 |
| 2007/0078908 | A1 | 4/2007 | Rohatgi et al. |
| 2008/0001704 | A1 * | 1/2008 | Roston .......................... 340/5.8 |
| 2008/0014869 | A1 | 1/2008 | Demirbasa et al. |
| 2013/0256396 | A1 * | 10/2013 | Rogers et al. ................. 235/375 |

* cited by examiner

*Primary Examiner* — Aaron W Carter
(74) *Attorney, Agent, or Firm* — Schwartz Law Firm, P.C.

(57) ABSTRACT

The present invention is directed to a security system and method for child safety. Advantageously, the present invention includes displaying an image of a child, and for departure, the child recognizing the image of himself/herself, and being informed upon seeing his/her image that a person has arrived who is authorized to leave a setting such as a day care center, with the child. The invention is particularly useful in the case of young children unable to read, but capable of identifying their own images.

22 Claims, 4 Drawing Sheets

SECURITY SYSTEM

FIELD OF THE INVENTION

The present invention relates to child safety, and more particularly to secure transfer of responsibility for a child between a setting in which a child is left in temporary care, and a person leaving the child or authorized to leave with the child.

BACKGROUND OF THE INVENTION

There are a variety of settings in which a child is left in temporary care. Settings include child care organizations such as child or day care centers and schools. Child safety makes secure transfer of responsibility for a child between a setting in which a child is left in temporary care, and a person authorized to leave the child or to leave with the child, necessary.

As illustrated by U.S. Pat. No. 4,350,969 to Greer, U.S. Pat. No. 5,021,780 to Fabiano and U.S. Pat. No. 6,958,701 to Storkamp, it is known to use a radio wave transmitter and receiver, to provide an audible sound or visual indication in the home of a child to be picked up by a bus, to provide an alert that the bus is approaching the child's boarding site.

As exemplified by published U.S. Patent Application 2007/00789 to Rohatgi, it is known for a child care center to create a database that includes a profile of a child that includes the child's personal information and image and/or biometric data of the child, a profile of a guardian that includes a guardian's personal information and image and biometric data of the guardian, a list of children for each guardian, and check-in and check-out requirements that may include identify confirmation by use of biometric data and/or image data. FIG. 7 describes that for a guardian to check out a child, biometric data is obtained from the guardian, and that matching of the guardian's biometric data with biometric data stored in the database results in a display of the guardian's personal information and a list of children associated with the guardian.

As illustrated by U.S. Pat. No. 5,423,574 to Forte-Pathroff, it is known to associate a child with a person authorized to leave with the child from a setting such as a child care facility, by use of a common unique identifier such as a barcode, and for the child and authorized person to each wear a barcode bracelet, and to scan the barcode bracelets when they attempt to leave together.

It is also known as exemplified by U.S. Pat. No. 7,233,240 to Phillips, for a child to wear a barcode bracelet and for the bracelet to be scanned as the child enters and exits a day care bus.

Despite improvements in providing for child safety, there continues to be a need for improving secure transfer of responsibility for a child, particularly given that a person leaving a child or authorized to leave with a child typically arrives in a vehicle. In addition, there continues to be a need to provide for an orderly transfer of responsibility.

SUMMARY OF THE INVENTION

The present invention is directed to a security system for providing for child safety, and in particular to a security system and method for providing for secure transfer of responsibility for a child, when a person leaving a child or authorized to leave with a child arrives in a vehicle. The inventive security system includes a sensor for collecting unique identifying information from a vehicle entering a secure area, and a computer in electronic communication with the sensor for receiving unique identifying information from the sensor.

In addition, the inventive security system includes a computer program running on the computer, wherein the computer program receives the unique identifying information, and furthermore includes a database in electronic communication with the computer program, wherein the database includes a plurality of database records that include identifying images of children in association with unique identifiers to be matched to the received unique identifying information. The computer program comprises program code for comparing the received unique identifying information with the unique identifiers in the database.

Additionally, the inventive security system includes at least one display in electronic communication with the computer, for displaying information including beneficially an identifying image of each child associated with at least one unique identifier in the database, in response to the received unique identifying information matching a unique identifier in the database. Accordingly, the matching may advantageously result in an identifying image of each sibling being displayed.

In accordance with the inventive security system, an identifying image of a child is displayed in a location that informs the child upon seeing his/her identifying image, that a person authorized to leave with the child, has arrived. Furthermore, in the case of multiple pick up or drop off stations, an identifier understandable by a child such as a color, for identifying a particular station for pick up or drop off, may advantageously be displayed in association with an identifying image of a child.

To assist orderly pick up and drop off, identifying images of children of different families are displayed beneficially in an order that corresponds to the order that vehicles of the families arrive, and that unique identifying information is collected from the vehicles.

The inventive security system may beneficially also include a printer for printing identification passes, and may advantageously include identification passes. An identification pass for a child beneficially includes an identifying image of the child, and an identifying image of each person authorized to leave with the child, as well as any restrictions with respect to each authorized person.

In accordance with the inventive security system, the child may advantageously be given an identification pass to take to the identified pick up station. At the pick up station, a boarding attendant may beneficially refer to the identification pass to visually confirm the child's identity, and to visually confirm that an authorized person is in the vehicle. Conveniently, the identification pass may be returned by the child to the attendant prior to or in the course of boarding the vehicle, and thereafter identification passes may be compiled and reorganized for re-use. Conveniently, the boarding attendant may place aside an identification pass received from a prior child in advance of accepting an identification pass from the next child.

Also provided is a method of providing for secure transfer of responsibility for a child. The inventive method includes the steps of collecting unique identifying information from a vehicle entering a secure area, and comparing the collected unique identifying information with a plurality of unique identifiers in a database. The method further includes displaying information including an identifying image of each child associated with at least one unique identifier in the database, in response to the collected unique identifying information matching at least one unique identifier in said database; and displaying the identifying image in a location for each child to see his/her identifying image so as to inform each child that a person authorized to leave with the child has arrived.

Additional advantages and beneficial features of the present invention are set forth in the drawing and detailed description, and in part will become apparent to those skilled in the art upon examination of the drawing and detailed description or may be learned by practice of the invention. As will be realized, this invention is capable of other and different embodiments than those described, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference now is made to the accompanying drawing which forms a part of the specification of the present invention.

DETAILED DESCRIPTION OF THE INVENTION

The present invention relates to child safety, and may be beneficially used by, for example, a child or day care center or school, or any other setting in which a child is left in temporary care. Typically, an authorized person arrives in a vehicle. In such case, when departing, it is important that a child does not leave the safety of a setting, for example, a building, until the vehicle arrives to pick up the child, and that the child only enter a vehicle occupied by an authorized person.

Advantageously, the present invention includes the features of displaying an image of a child, the child recognizing the image of himself/herself, and being informed upon seeing his/her image that a person has arrived who is authorized to leave a setting such as a day care center, with the child. The invention is particularly useful in the case of young children unable to read, but capable of identifying their own images. As will be readily understood, the applicability of the invention extends beyond young children unable to read. In addition, the present invention provides for an orderly transfer of responsibility for a child between a child care setting and a person leaving the child or authorized to leave with the child.

Figure 1:
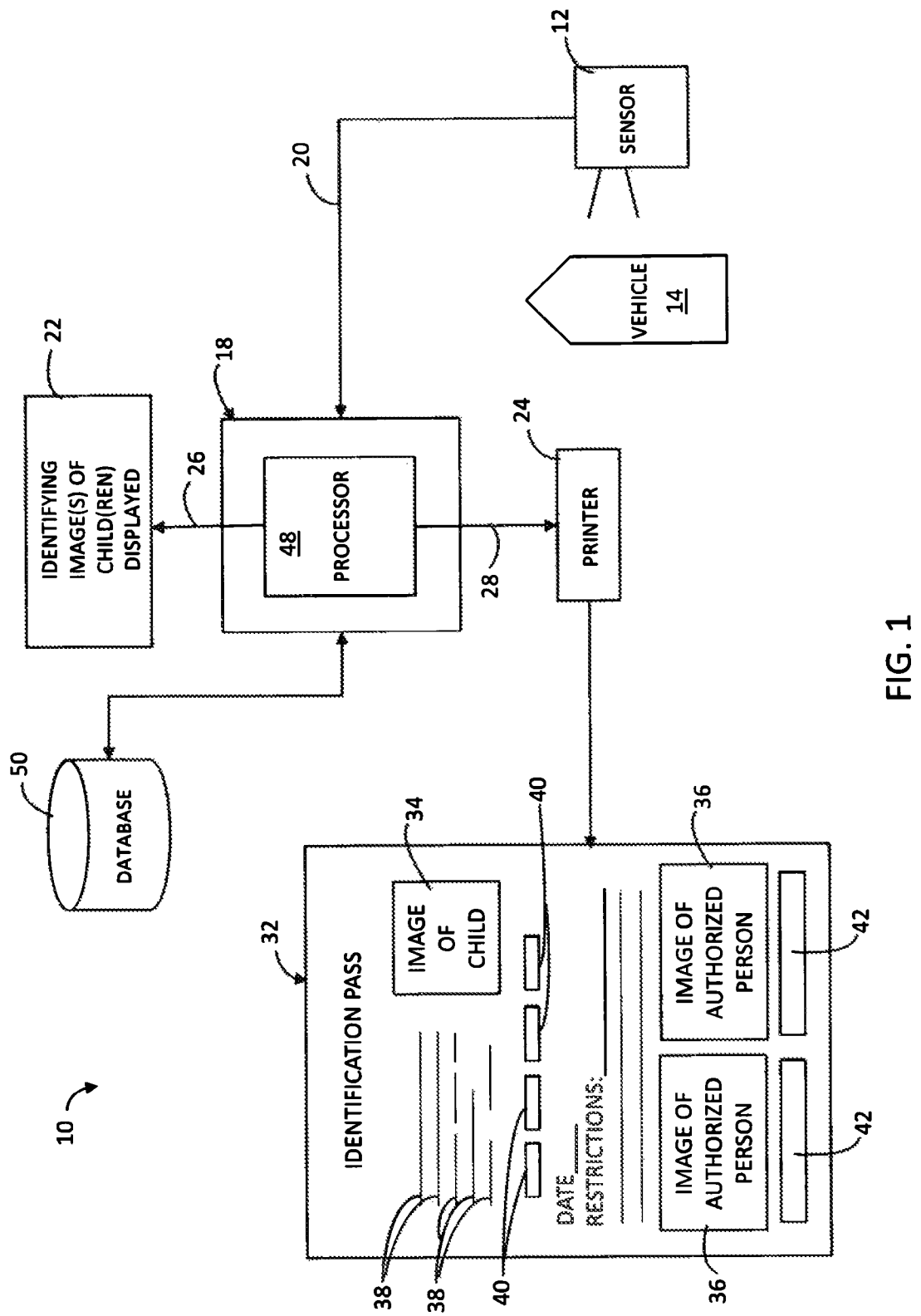
FIG. 1 is a schematic diagram that provides an overview of beneficial components of an inventive security system.

Referring to an inventive embodiment illustrated in FIG. 1, a security system 10 in accordance with the present invention, beneficially includes a sensor 12 appropriately located for collecting unique identifying information from each vehicle 14 entering a secure area. Conveniently, sensor 12 may be mounted on a structure such as a post (not shown) set in concrete.

Useful sensors include barcode scanners or readers, and RFID sensors, and unique identifying information thus includes identifiers encoded as barcodes and identifiers stored in RFID tags. A barcode scanner may be a laser scanner. In the case of a sensor such as a barcode scanner or reader, a coded medium (not shown) such as an identification tag in the form of a barcode sticker may be affixed to a window of each vehicle. In the case of an RFID sensor, an RFID tag or transponder (not shown) may be in the vehicle, and may be battery powered. The coded medium or RFID tag or transponder is advantageously located or positioned so as to allow sensor 12 to easily collect unique vehicle identifying information.

Sensor 12 may advantageously be manually shut off and additionally include a timed feature for automatic sensor shut down after a predetermined period of inactivity. To activate a sensor that is not in an active sensing state, the inventive security system may include an activating sensor or device (not shown) in electronic communication with sensor 12 that is appropriately located for activating sensor 12 as a vehicle enters a secure area. Useful activating devices include a conventional cable loop (not shown) in the roadway over which a vehicle will pass as it enters a secure area, and a motion sensor.

For sake of brevity of this portion of the description of the invention, because the use of a scanner for reading a coded medium is conventional, and the use of RFID sensors for receiving information from RFID tags or transponders is conventional, no further details are provided of an advantageous vehicle identifying information-collecting feature.

With continued reference to FIG. 1, sensor 12 is in communication with a computer 18 for communicating identifying information collected by the sensor. Conveniently, electronic communication between the sensor and computer may be provided by an RS 232 cable interface 20. Also in communication with the computer is at least one display 22, and at least one printer 24. Conveniently, electronic communication between the computer and a display may be provided by a cable 26 suitable for this purpose, and between the computer and a printer may be provided by a suitable printer cable 28. If desired, communication between computer 18 and one or more displays and/or one or more printers may be via a network that may include one or more additional computers, and computer 18 or another computer may be a server computer for the network. Wireless transmission may be used if desired.

Display 22, which may beneficially be used for arrival and departure, is used to display information that includes identifying images of children. For departure, when using one display, children may be in one room, or prior to departure, children may be gathered into one room or area, and one display may be sufficient. Alternatively, as mentioned, security system 10 may include additional displays. In such case, children may be in more than one room or area, and a display may be located in each room or area.

For departure, a display advantageously is appropriately located so that each child may see his/her image, and the image beneficially is displayed, at an appropriate time that corresponds to the arrival of an authorized vehicle indicating that a person authorized to leave with the child has arrived. For arrival, the image beneficially is displayed at an appropriate time that corresponds to the arrival of an authorized vehicle indicating that a person authorized to leave the child has arrived. Thus, in accordance with the invention, for departure, display of a child's image is timed to inform a child that a person authorized to leave with the child has arrived, and the display is located for viewing by the child.

Printer 24 is used to print an identification pass 32, which advantageously includes an identifying image of a child, as depicted by box 34, and an identifying image of each person authorized to leave with the child, as depicted by blocks 36. Conveniently, a digitized image of a driver's license of an authorized person may be used to provide an identifying image of the authorized person. Pass 32 may also, as indicated thereon by lines 38, include alphanumeric information pertaining to the child such as the child's name, the family address, a home telephone number and any cell telephone numbers of the child's guardians; one or more unique vehicle identifiers, as indicated by blocks 40; any authorized person restrictions; and, as indicated by "DATE" and by blocks 42, a dated signature of each guardian of the child.

The term "guardian" as used in this description of the invention, means a child's parent and any other person who legally has care of the child. An authorized person may or may not be a guardian. Authorized person restrictions may exist, for example, with respect to certain days; thus, one parent may be an authorized person on Monday, Wednesday and Friday, and another parent may be an authorized person on Tuesday and Thursday. Other possible authorized person restrictions are self-evident.

Conveniently running on computer 18, which includes a processor 48, is an operative computer program (not shown). The computer program receives identifying information collected by sensor 12.

With continued reference to FIG. 1, the security system further includes a database 50 in electronic communication with the computer program. The database includes a plurality of database records. As indicated by FIG. 1, the database may be stored using electronic information storage of another computer or portable electronic storage media, or electronic information storage of computer 18 may be used for storage of the database.

Beneficially, database 50 includes database records comprising identifying images of children in association with unique vehicle identifying information. For example, database 50 may include a plurality of family records, and each family record may include information for each child to be left in temporary care including an identifying image of each such child, and one or more unique vehicle identifiers. Each family record may additionally include alphanumeric information pertaining to the family, alphanumeric information pertaining to each such child including the child's name, alphanumeric information pertaining to each vehicle to be used by the family, and an identifying image of each person authorized to leave with the child, and alphanumeric information pertaining to each such authorized person. Each family record may be assigned a unique record number.

Each vehicle to be used for dropping off or picking up a child may beneficially be assigned a unique vehicle identifier. In such case, if a family intends to use more than one vehicle, the family record will include a unique vehicle identifier for each such vehicle. For example, if mom will be using one vehicle and dad will be using another vehicle, the family record will include two unique vehicle identifiers. Likewise, if mom is the only person authorized for pick up or drop off, but intends to use either of two vehicles, the family record will include two unique vehicle identifiers. A family record may additionally include the name of the owner of each vehicle to be used. Alternatively, as explained in further detail latex, depending upon the number of children in a family, more than one unique vehicle identifier may be assigned per vehicle.

Alphanumeric information pertaining to a family may include pertinent family information such as the parent's names, the family address, and home and cell telephone numbers. As explained, an authorized person may or may not be a guardian. Alphanumeric information pertaining to an authorized person may include pertinent information such as the person's name, address, and home and cell telephone numbers. Conveniently, an image of an authorized person may be a digitized image obtained by scanning an authorized person's driver's license. In this way, alphanumeric information pertaining to an authorized person may be scanned into the family record. As can be understood, driver's license information should be confirmed to be current, and additional alphanumeric information pertaining to an authorized person may be added to a family record.

Figure 2:
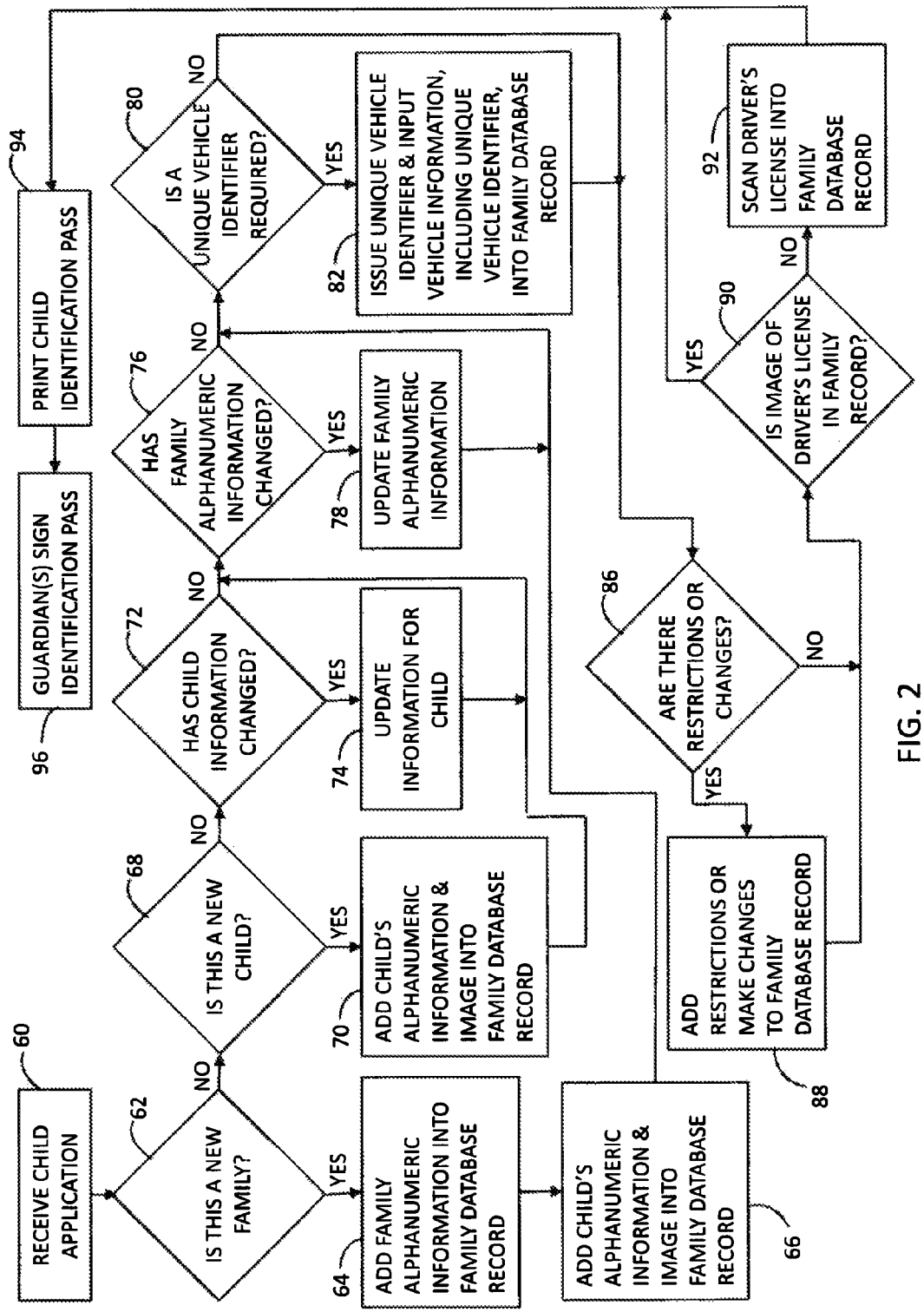
FIG. 2 is a simplified flow diagram for processing an application for care of a child that includes creating a family database record, or for changing the contents of a family database record.

Referring now to the simplified flow diagram of FIG. 2, using this flow diagram, a first child to be left in temporary care is processed, any second child of the family is processed next, and so forth, and a family record is created in the database that includes information for each child to be left in temporary care and other information as now described. Furthermore, using this flow diagram, changes and additions may be made to a family record.

With continued reference to FIG. 2, an application for care of a child is received, as depicted by block 60. First, the algorithm may determine new family status, as depicted by decision box 62. If "yes", then the algorithm allows a new family record to be added to the database; and, as depicted by blocks 64 and 66, family alphanumeric information and alphanumeric information for the child may be added to the family database record, and an identifying image of the child is added to the family database record.

When processing an application for care of a second child or of an additional child of the family, or changing the contents of a family record, the response to the inquiry "Is this a new family" is "no". The algorithm may then determine, as depicted by decision box 68, whether the child is a new child. If "yes", then, as depicted by block 70, alphanumeric information for the second or an additional child may be added to the family database record, and an identifying image of the second or additional child is added to the family database record.

If the response to the inquiry "Is this a new child?" is "no", the algorithm may then determine, as depicted by decision box 72, if there is a change in child information. If "yes", then updated alphanumeric information and/or an updated identifying image of the child may, as depicted by block 74, be added to the family database record.

If the response to the inquiry "Has child information changed?", is "no", or when, as depicted by block 70, an image of the second or an additional child is added to the family database record, or when, as depicted by block 74, child information is updated, the algorithm may then determine, as depicted by decision box 76, if there is a change in family alphanumeric information. If "yes", then updated family alphanumeric information may, as depicted by block 78, be added to the family database record.

If the response to the inquiry "Has family alphanumeric information changed?", is "no", or when, as depicted by block 66, a child's image is added to the family database record, or when, as depicted by block 78, family information is updated, the algorithm may then determine, as depicted by decision box 80, if a unique vehicle identifier is required. If "yes", then, as depicted by block 82, a unique vehicle identifier is issued to the family, and vehicle information including the unique vehicle identifier is inputted into the family database record.

As explained earlier, each vehicle to be used in dropping off or picking up a child may beneficially be assigned a unique vehicle identifier. In such case, more than one unique vehicle identifier may be issued to a family and information for each additional vehicle including its unique identifier, may added to the family database record. Accordingly, although not shown in the simplified flow diagram of FIG. 2, after, as depicted by block 82, a unique vehicle identifier has been entered in the family database record, the algorithm may determine whether another unique vehicle identifier is required; and if "yes", a second unique vehicle identifier may be issued and entered in the family database record. Following this sequence, the algorithm may, although not shown, provide for a unique vehicle identifier to be issued for each vehicle to be used, and for information for each such vehicle including its unique identifier to be added to the family database record.

After one or more unique vehicle identifiers have been issued and entered in the family database record, or if the response to decision box 80 is "no", the algorithm may then determine, as indicated by decision box 86, whether there are any changes or any restrictions with respect to persons authorized to leave with a family's child(ren). In the case of initially processing a family's first child, there will be no changes, but there may be restrictions. If "yes" in the case of a family's first child, restrictions will be added to the family database record, as depicted by block 88. Subsequently, it may be desirable to delete an individual as an authorized person; in such case, as depicted by block 88, the family database record may be changed by deleting an individual as an authorized person. A result is that an image of the individual may likewise be deleted from the family database record.

If the response to "Are there authorized person restrictions or changes" is "no", or after changes have been made or restrictions added to the family database record, the algorithm will then confirm that an identifying image of each person authorized to leave with a family's child(ren) is in the family database record. To this end, a driver's license may conveniently be used to provide an identifying image, and the algorithm may determine, as depicted by decision box 90, whether an image of a driver's license of an authorized person is in the family record. If "no", then, as depicted by block 92, the driver's license of an authorized person will be scanned into the family database record.

As indicated earlier, more than one person may be authorized to leave with a family's child(ren). In such case, although not shown in the simplified flow diagram of FIG. 2, after, as depicted by block 92, an identifying image of an authorized person has been added to the family database record, the algorithm may then determine whether there is another authorized person. If "yes", then the driver's license of a second authorized person may be scanned into the family database record. Following this sequence, the algorithm may provide for an identifying image of each person authorized to leave with a family's child(ren) to be added to the family database record.

After an image of each authorized person has been added to the database, or if the response to decision box 90 is "yes", an identification pass for a child may, as depicted by block 94, be printed. Then, as depicted by block 96, the application process for a child may be completed by one or more guardians of a child reviewing and signing the child's identification pass.

As mentioned, FIG. 2 is a simplified flow diagram; and additions that are not shown, have been described. Other additions or changes not shown or described can be readily appreciated. For example, a family may choose to delete a vehicle from its family record, or may choose to delete a child from its family record. Furthermore, it will be readily apparent to one skilled in writing program code, that changes can be made in the order of steps. Thus, FIG. 2 is merely illustrative of a useful flow diagram for creating a database that includes a plurality of family records, in which each family record includes an identifying image of at least one child to be left in temporary care, and one or more unique vehicle identifiers.

Each family record may be assigned a unique record number. In addition, each family record may, as illustrated by diagram of FIG. 2, additionally include alphanumeric information pertaining to the family, alphanumeric information pertaining to each child including the child's name, alphanumeric information pertaining to each vehicle to be used by the family, and an identifying image of each person authorized to leave with the child, and alphanumeric information pertaining to each such person.

It will be readily understood by one skilled in writing program code, that information may be arranged in other ways in database 50. For example, the database may include family records each comprising alphanumeric information pertaining to a family; records of children each comprising a digital image of a child, and alphanumeric information pertaining to the child such as the child's name; records of persons authorized to leave with children, each authorized person record comprising an identifying image of an authorized person, and alphanumeric information pertaining to each such authorized person; and records of vehicles registered for child drop off and pick up, each vehicle record including a unique vehicle identifier. The records of each family may be associated with one another by a unique record number assigned to the family, and in this manner, identifying images of one or more children of a family may be in association with one or more unique vehicle identifiers.

Regardless of how database 50 is constructed, it will be apparent that in a simple database construction, identifying images of children and unique vehicle identifiers are sufficient. However, as previously described with reference to FIG. 2, the application process may beneficially include printing an identification pass for a child that may include additional useful information, and as previously described with reference to FIG. 1, identification pass 32 beneficially also includes an identifying image of each person authorized to leave with child(ren) of a family, as well as any restrictions with respect to each authorized person, and the child's name.

If desired, a family's unique record number may be maintained confidential. In such case, a unique family record number may be a hidden field that is not revealed whether by any display, printing or otherwise.

Figure 3:
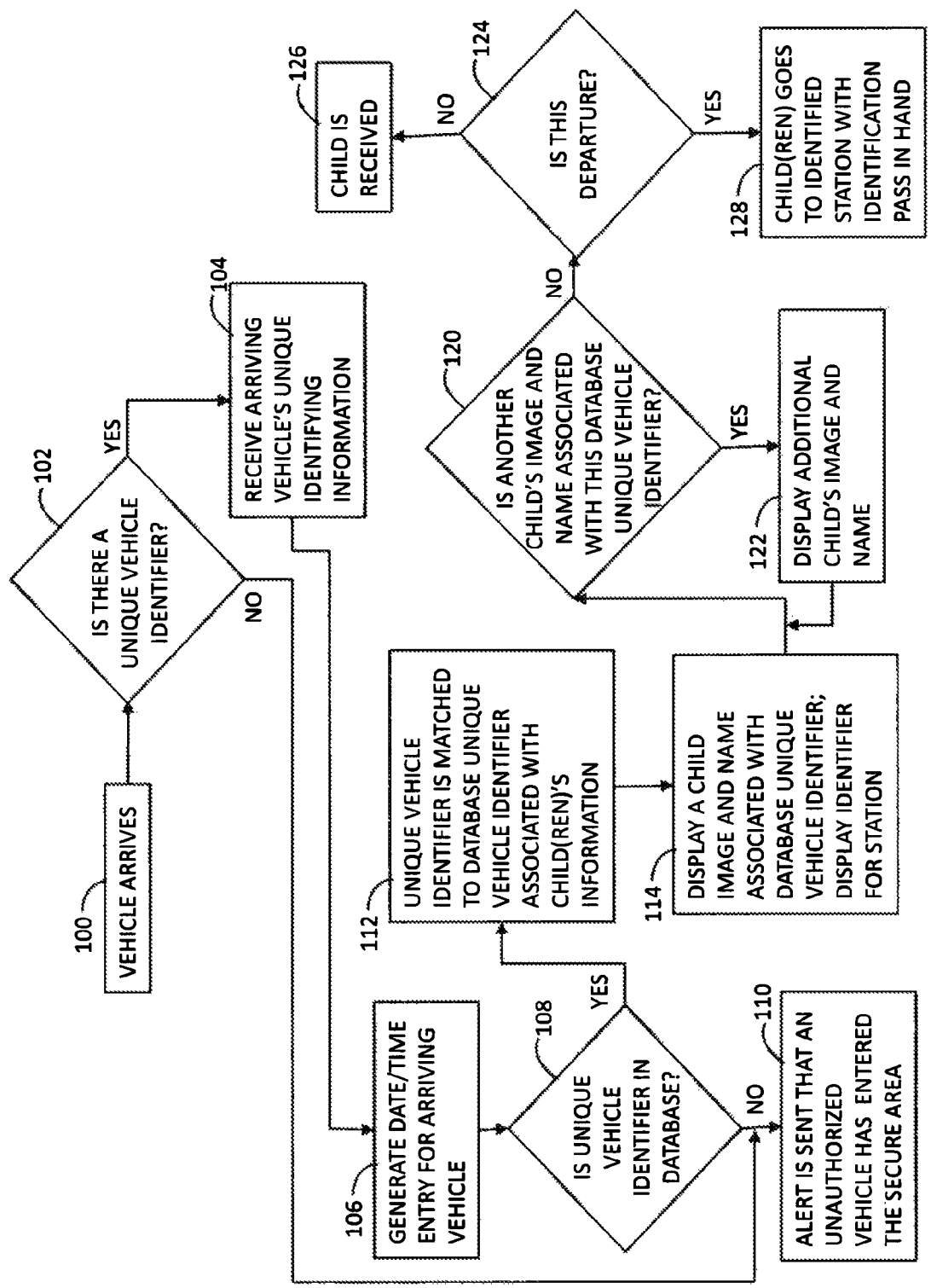
FIG. 3 is a simplified flow diagram for tracking each vehicle that arrives, for generating information display in response to unique identifying information being collected from a vehicle, and for orderly and secure transfer of responsibility for a child.

Referring now to the flow diagram of FIG. 3, when a vehicle, as indicated by block 100, enters a secure area, a sensor in an active state, determines whether there is a unique vehicle identifier, as depicted by block 102. If so, as indicated by block 104, the sensor collects the unique identifying information from the vehicle, and the information is received by an operative computer program running on a computer. The algorithm may then, as depicted by block 106, generate a time/date entry for the arriving vehicle. Although not shown, if no unique identifying information is collected by the sensor from the vehicle, the algorithm may generate a time/date entry for such an event.

When unique identifying information is collected by the sensor from the vehicle, the algorithm may then determine, as depicted by decision box 108, whether the unique identifying information received is in database 50. If "no", or if "no" with respect to decision box 102, then, as depicted by block 110, an alert may be sent that an unauthorized vehicle has entered the secure area. In such case, the vehicle driver may be asked to park and be identified. If desired, an alert message may be displayed.

If the comparison determines that the received unique identifying information matches a unique vehicle identifier in the database, then, as depicted by block 112, database child(ren)

information associated with the unique vehicle identifier is located. Then, as depicted by block 114, a display is instructed to display information of a child including an identifying image of the child, associated with the unique vehicle identifier. Beneficially, the display may also be instructed to display the name of the child, and an identifier understandable by a child, such as a color, for identifying a particular pick up or drop off station in the case of multiple stations. If desired, the date and time of a vehicle's arrival may also be displayed.

The algorithm may then determine, as depicted by decision box 120, whether another child's information is associated with the unique vehicle identifier. If "yes", the display is instructed, as depicted by block 122, to display information of the child including an identifying image of the child. Following this sequence, the algorithm may provide for information of each child associated with the unique vehicle identifier to be displayed.

It should be understood, however, as earlier indicated, that in its broadest aspect, a security system in accordance with the present invention, need only associate one child of a family with one unique vehicle identifier. In other words, for instance, in the case of a family with two children, a vehicle could be provided with two unique identifiers, with one unique identifier for one child and a second unique identifier for the second child.

If the answer to decision box 120 is "no", the algorithm may then determine, as depicted by decision box 124, whether the event is a departure. If "no", then, as depicted by block 126, the child is received at the identified drop off station.

As explained, a display is located so that it can be viewed by children being picked up. When a child sees his/her image displayed and, beneficially also sees an identifier such as a color for informing the child to go to an identified pick up station, the child is thereby informed that a person authorized to leave with the child has arrived, and thereby is informed to go to the identified pick up station. In this case, the algorithm determines that the event is a departure.

As depicted by block 128, each child may advantageously be given an identification pass to take to the indicated pick up station, and may be escorted to the pick up station. The identification pass beneficially includes an identifying image of the child, the child's name, and an identifying image of each person authorized to leave with the child. At the pick up station, a boarding attendant may advantageously refer to the identification pass to visually confirm the child's identity, and to visually confirm that an authorized person is in the vehicle. Conveniently, transfer of responsibility includes a departing child returning an identification pass to a boarding attendant prior to or in the course of boarding the vehicle. Thereafter identification passes may be compiled and organized for re-use. Conveniently, to reduce the opportunity for a mistake, the boarding attendant may place aside in a suitable receptacle an identification pass received from a departing child, in advance of accepting an identification pass from the next child to board a vehicle.

As described in the case of multiple stations for drop off and pick up, there may beneficially be associated in one way or another with a displayed identifying image of a child, an identifier for informing the child to go to a specific pick up station. To this end, for children unable to read, colors or numbers or shapes understandable by children unable to read and that the children may easily remember, may be used. Thus, several different colors such as red, green and blue, or several different numbers such as "1", "2" and "3" may be used, or several different shapes such as a square, a circle, and a star. In combination therewith, there may be, for example, stations marked red, green or blue, or marked "1", "2" or "3", or marked with a square, a circle or a star. It will be recognized that other indicators understandable by children unable to read may be used, and that the numbers of stations may be one, two, three or more as desired or appropriate.

Figure 4:
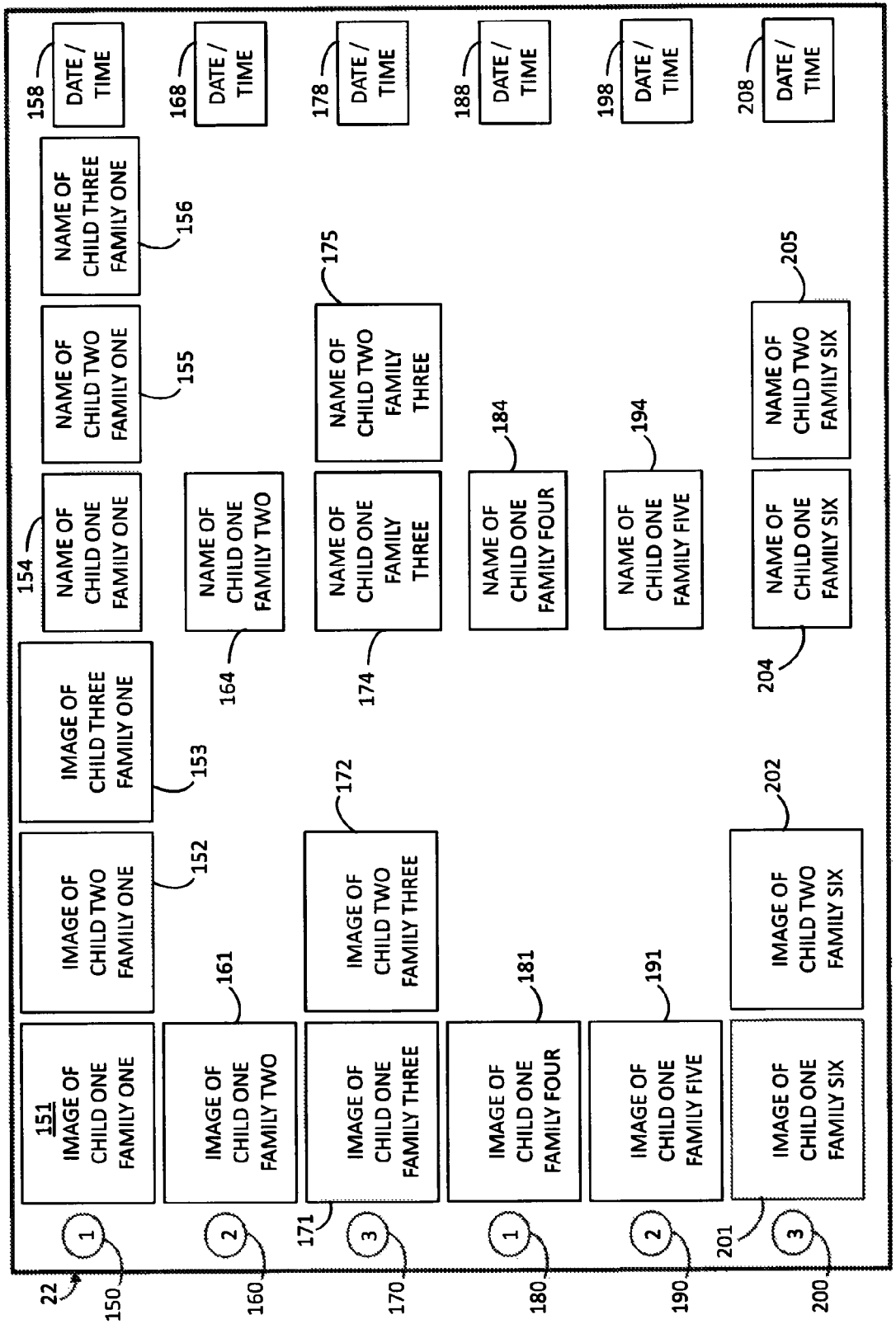
FIG. 4 is a block diagram of an illustrative display output that corresponds to the order that vehicles of families arrive, and that unique identifying information is collected from the vehicles.

Referring now to FIG. 4, as explained, display 22 is used to display information that includes an identifying image of a child, at an appropriate time that corresponds to the arrival of an authorized vehicle, and may beneficially display an identifier for indicating a specified drop off or pick up station, the child's name, and the date/time of the vehicle's arrival. Thus, with the drop off or pick up of child one of the first family to arrive, an identifying image of child one is displayed, as depicted by box 151, and in addition an identifier of the drop off or pick up station may be displayed, as depicted by circle 150, the name of child one may be displayed, as depicted by block 154, and the date/time of the vehicle's arrival may be displayed, as depicted by block 158. Because the family includes two more children, identifying images of the additional children are displayed, as depicted by boxes 152,153, and the names of the additional children are displayed, as depicted by boxes 155,156.

With the drop off or pick up of child one of the second family to arrive, an identifying image of child one is displayed, as depicted by box 161, and in addition an identifier of a different drop off or pick up station may be displayed, as depicted by circle 160, the name of child one may be displayed, as depicted by block 164, and the date/time of the vehicle's arrival may be displayed, as depicted by block 168.

With the drop off or pick up of child one of the third family to arrive, an identifying image of child one is displayed, as depicted by box 171, and in addition an identifier of an additional different drop off or pick up station may be displayed, as depicted by circle 170, the name of child one may be displayed, as depicted by block 174, and the date/time of the vehicle's arrival may be displayed, as depicted by block 178. Because the family includes a second child, an identifying image of the second child is displayed, as depicted by box 172, and the name of the additional child is displayed, as depicted by box 175.

The number "1" in circle 150, the number "2" in circle 160, and the number "3" in circle 170 illustrate that these circles differ from each other in one way or another, such as color or numbering, and correspond to drop off or pick up stations marked in a like manner. As previously explained, geometric symbols understandable by a child such as a square, circle and star, could be used instead of numbered or colored circles.

With continued reference to FIG. 4, with the drop off or pick up of child one of the fourth family to arrive, an identifying image of child one is displayed, as depicted by box 181, and in addition an identifier of a station corresponding to the station indicated by circle 150 may be displayed, as depicted by circle 180 (which likewise contains the number "1"), the name of child one may be displayed, as depicted by block 184, and the date/time of the vehicle's arrival may be displayed, as depicted by block 188.

With the drop off or pick up of child one of the fifth family to arrive, an identifying image of child one is displayed, as depicted by box 191, and in addition an identifier of a station corresponding to the station indicated by circle 160 may be displayed, as depicted by circle 190 (which likewise contains the number "2"), the name of child one may be displayed, as depicted by block 194, and the date/time of the vehicle's arrival may be displayed, as depicted by block 198.

With the drop off or pick up of child one of the sixth family to arrive, an identifying image of child one is displayed, as depicted by box 201, and in addition an identifier of a station corresponding to the station indicated by circle 170 may be displayed, as depicted by circle 200 (which likewise contains the number "3"), the name of child one may be displayed, as depicted by block 204, and the date/time of the vehicle's arrival may be displayed, as depicted by block 208. Because the family includes a second child, an identifying image of the additional child is displayed, as depicted by box 202, and the name of the additional child is displayed, as depicted by box 205.

As thus described, to assist orderly pick up and drop off, identifying images of children of different families are displayed beneficially in an order that corresponds to the order that vehicles of the families arrive, and that unique identifying information is collected from the vehicles. In the case of three stations, orderly arrival may be accomplished by the first vehicle to arrive stopping at the first station, the second vehicle to arrive stopping at the second station, and the third vehicle to arrive stopping at the third station. Orderly departure may be accomplished by the vehicles leaving in the order of arrival. Continuing with respect to vehicle arrival, the fourth vehicle to arrive may stop at the first station, the fifth vehicle to arrive may stop at the second station, and the sixth vehicle to arrive may stop at the third station.

As illustrated by FIG. 4, all information in connection with each arriving vehicle may be displayed horizontally. Furthermore, as unique identifying information is received from each subsequently arriving vehicle, each horizontal line of information may move up or down a display screen.

Alternative ways of displaying information will be apparent to one skilled in writing program code. For instance, all information in connection with each arriving vehicle may be displayed vertically. Furthermore, as unique identifying information is received from each subsequently arriving vehicle, each vertical column of information may move left to right or right to left on a display screen Regardless of whether all information in connection with each arriving vehicle is displayed horizontally or vertically, or of the direction displayed information moves on a display, once a display screen is filled with displayed information, for instance, taking into account display size limitations and the number of families being served, the relatively oldest displayed information may conveniently be "pushed off" the display to provide for display of information in connection with the next arriving vehicle(s). Furthermore, depending upon display size limitations or other considerations, a display could display only information in connection with one arriving vehicle, or less than six or more than six arriving vehicles.

Various modifications and combinations have been described. The present invention may be carried out with other modifications and/or combinations without departing from the spirit or essential attributes thereof. Accordingly, reference should be made to the appended claims as indicating the scope of the invention.

The invention claimed is:

1. A computer-implemented security system, comprising:
a computer program comprising program code adapted for being executed by a computer to process authorized person identifying information collected when a vehicle enters a secure area comprising vehicle passenger drop-off and vehicle passenger pick-up activity;
an electronic database containing a plurality of database records comprising child identifying information to be matched to the authorized person identifying information, wherein said program code is adapted for being executed by the computer to compare said authorized person identifying information with said child identifying information in said database; and
means for automatically communicating a child identifier associated with said child identifying information in response to said authorized person identifying information matching said child identifying information in said database, and said child identifier comprising an image of the child;
whereby said child identifier is relayed to the child in a manner sufficient to advise the child that a person authorized to leave with the child has arrived.

2. The security system of claim 1, and comprising a secondary identifier understandable by a child for informing a child of a specified pick up station, said secondary identifier being automatically communicated in association with said child identifier.

3. The security system of claim 2, wherein said secondary identifier for informing a child of a specified pick up location is a color.

4. The security system of claim 1, and further comprising a plurality of identification passes each comprising an identifying image of each person authorized to leave with the child.

5. The security system of claim 4, wherein said identifying image of the authorized person is a digitized image of a driver's license of the authorized person.

6. A computer program product including program code tangibly stored on a non-transitory computer-readable medium and operable to cause a computer to perform a method designed to provide secure transfer of responsibility for a child, the method comprising:
collecting authorized person identifying information from a secure area comprising vehicle passenger drop-off and vehicle passenger pick-up activity;
comparing the collected authorized person identifying information with a plurality of electronic database records comprising child identifying information;
in response to the collected authorized person identifying information matching the child identifying information in the database, automatically communicating a child identifier understandable by the child for informing the child that a person authorized to leave with the child has arrived, the child identifier comprising an image of the child.

7. The computer program product according to claim 6, wherein the method further comprises automatically communicating a secondary identifier understandable by a child for informing a child of a specified pick up station in association with the child identifying information.

8. The computer program product according to claim 7, wherein the secondary identifier understandable by a child for informing a child of a specified pick up station is a color.

9. The computer program product according to claim 6, wherein the method further comprises communicating at least two identifying images of children of the same family in response to the authorized person identifying information matching the child identifying information in the database.

10. The computer program product according to claim 6, wherein the method further comprises referring to an identification pass comprising an identifying image of a child and an identifying image of each person authorized to leave with the child, to visually confirm that a person authorized to leave with the child has arrived.

11. A non-transitory computer-readable storage medium storing computer-executable code, executable by processing logic of a computer, that when executed by the processing logic, cause the processing logic to perform a method designed to provide secure transfer of responsibility for a child, the method comprising:

collecting authorized person identifying information from a secure area comprising vehicle passenger drop-off and vehicle passenger pick-up activity;

comparing the collected authorized person identifying information with a plurality of electronic database records comprising child identifying information;

in response to the collected authorized person identifying information matching the child identifying information in the database, automatically communicating a child identifier understandable by the child for informing the child that a person authorized to leave with the child has arrived, the child identifier comprising an image of the child.

12. The computer-readable storage medium according to claim 11, wherein the method further comprises automatically communicating a secondary identifier understandable by a child for informing a child of a specified pick up station in association with the child identifying information.

13. The computer-readable storage medium according to claim 12, wherein the secondary identifier understandable by a child for informing a child of a specified pick up station is a color.

14. The computer-readable storage medium according to claim 11, wherein the method further comprises communicating at least two identifying images of children of the same family in response to the authorized person identifying information matching the child identifying information in the database.

15. The computer-readable storage medium according to claim 11, wherein the method further comprises referring to an identification pass comprising an identifying image of a child and an identifying image of each person authorized to leave with the child, to visually confirm that a person authorized to leave with the child has arrived.

16. The computer-readable storage medium according to claim 11, wherein the step of advising the child that a person authorized to leave with the child has arrived comprises communicating the child identifying information on a viewable display.

17. A method designed to provide secure transfer of responsibility for a child, the method comprising:

collecting authorized person identifying information from a secure area comprising vehicle passenger drop-off and vehicle passenger pick-up activity;

comparing the collected authorized person identifying information with a plurality of electronic database records comprising child identifying information;

in response to the collected authorized person identifying information matching the child identifying information in the database, automatically communicating a child identifier understandable by the child for informing the child that a person authorized to leave with the child has arrived, the child identifier comprising an image of the child.

18. The method according to claim 17, and further comprising automatically communicating a secondary identifier understandable by a child for informing a child of a specified pick up station in association with the child identifying information.

19. The method according to claim 17, wherein the secondary identifier understandable by a child for informing a child of a specified pick up station is a color.

20. The method according to claim 17, and further comprising communicating at least two identifying images of children of the same family in response to the authorized person identifying information matching the child identifying information in the database.

21. The method according to claim 17, and further comprising referring to an identification pass comprising an identifying image of a child and an identifying image of each person authorized to leave with the child, to visually confirm that a person authorized to leave with the child has arrived.

22. The method according to claim 17, wherein the step of advising the child that a person authorized to leave with the child has arrived comprises communicating the child identifying information on a viewable display.

* * * * *